US008043586B2

(12) United States Patent
Tranter et al.

(10) Patent No.: US 8,043,586 B2
(45) Date of Patent: Oct. 25, 2011

(54) METHODS OF USING ADSORPTION MEDIA FOR SEPARATING OR REMOVING CONSTITUENTS

(75) Inventors: Troy J. Tranter, Idaho Falls, ID (US); R. Scott Herbst, Idaho Falls, ID (US); Nicholas R. Mann, Blackfoot, ID (US); Terry A. Todd, Aberdeen, ID (US)

(73) Assignee: Battelle Energy Alliance, LLC, Idaho Falls, ID (US)

( * ) Notice: Subject to any disclaimer, the term of this patent is extended or adjusted under 35 U.S.C. 154(b) by 851 days.

(21) Appl. No.: 11/941,428

(22) Filed: Nov. 16, 2007

(65) Prior Publication Data

US 2011/0168638 A1 Jul. 14, 2011

Related U.S. Application Data

(62) Division of application No. 10/656,028, filed on Sep. 4, 2003, now Pat. No. 7,368,412.

(51) Int. Cl.
*B01D 53/02* (2006.01)
(52) U.S. Cl. ............... 423/210; 423/245.1; 423/351
(58) Field of Classification Search .......... 423/210, 423/245.1, 351, 364, 413
See application file for complete search history.

(56) References Cited

U.S. PATENT DOCUMENTS

| | | | |
|---|---|---|---|
| 4,039,444 A | 8/1977 | Bory et al. | |
| 4,576,969 A | 3/1986 | Echigo et al. | |
| 4,624,845 A | 11/1986 | Laundon et al. | |
| 5,591,346 A | 1/1997 | Etzel et al. | |
| 5,788,826 A | 8/1998 | Nyberg | |
| 5,895,796 A | 4/1999 | Mouri et al. | |
| 6,001,258 A | 12/1999 | Sluys et al. | |
| 6,045,697 A | 4/2000 | Girot et al. | |
| 6,136,199 A | 10/2000 | SenGupta et al. | |
| 6,232,265 B1 | 5/2001 | Bruening et al. | |
| 6,290,848 B1 | 9/2001 | Tanner et al. | |
| 6,461,535 B1 | 10/2002 | de Esparza | |
| 6,641,719 B1 | 11/2003 | Naito | |
| 6,656,350 B2 | 12/2003 | Kitakaze | |
| 6,809,062 B2 | 10/2004 | Driehaus | |
| 6,881,327 B2 | 4/2005 | Tanner et al. | |
| 6,881,333 B2 | 4/2005 | Ozeki et al. | |
| 6,914,034 B2 | 7/2005 | Vo | |
| 7,368,412 B2 * | 5/2008 | Tranter et al. ............... 502/406 |
| 7,429,551 B2 | 9/2008 | Vo | |
| 2002/0121470 A1 | 9/2002 | Mann et al. | |
| 2005/0247636 A1 | 11/2005 | Schlegel | |
| 2005/0288181 A1 | 12/2005 | Tranter et al. | |

FOREIGN PATENT DOCUMENTS

RU 2045994 C1 10/1995

OTHER PUBLICATIONS

Arsenic in Drinking Water: 2001 Update, National Research Council, National Academy Press, 24-69, 2001.
Borgono, J. M., Vincent, P., Venturino, H., Infante, A. Arsenic in the Drinking Water of the City of Antofagasta: Epidemiological and Clinical Study before and after Installation of a Treatment Plant. Environmental Health Perspectives, 19, 103-105, 1997.
Bowen, H. J. M. (1979). Elemental Chemistry of the Elements, Academic Press, London and New York, 13-62.
Chakravarty, S., Durega, V., Bhattacharyya, G., Maity, S., Bhattacharjee, S. Removal of Arsenic from Groundwater Using Low Cost Ferruginous Manganese Ore. Water Research, 36, 625-632, 2002.
Chanda, et al., "Ligand Exchange Sorption of Arsenate and Arsenite Anions by Chelating Resins in Ferric Ion Form: I. Weak-Base Chelating Resin Dow XFS-4195," Reactive Polymers, 7 (1988) pp. 251-261.
Chanda, et al., "Ligand Exchange Sorption of Arsenate and Arsenite Anions by Chelating Resins in Ferric Ion Form: II. Iminodiacetic Chelating Resin Chelex 100," Reactive Polymers, 8 (1988) pp. 85-95.
Chen, S. L., Dzeng, S. R., Yang, M. H., Chiu,, K. H., Shieh, G. M., Wai, C. M. Arsenic Species in Groundwaters of he Blackfoot Disease Area, Taiwan. Environmental Science and Technology, 28, 877-881, 1994.
Chwirka, J. D., Thomson, B. M., Stomp, J. M. Removing Arsenic from Groundwater. Jour. American WaterWorks Assoc., 92(3); 79-88, 2000.
Dambies, L. Existing and Prospective Sorption Technologies for the Removal of Arsenic in Water. Separation Science and Technology, 39(3), 603, 627, 2004.
Das, D., Samanta, G., Mandel, B. K., Chowdhury, T. R., Chandra, C. R., Chowdhurry, P. P. , Basu, G. K., Chakraborti, D. Arsenic in Groundwater in Six Districts of West Bengal, India. Environ. Geochem. Hlth., 18, 5-15, 1996.
Daus, B., Wennrich, R., Weiss, H. Sorption Materials for Arsenic Removal from Water: A Comparative Study. Water Research, 38, 2948-2954, 2004.

(Continued)

*Primary Examiner* — Edward M Johnson
(74) *Attorney, Agent, or Firm* — TraskBritt

(57) ABSTRACT

Methods of using an adsorption medium to remove at least one constituent from a feed stream. The method comprises contacting an adsorption medium with a feed stream comprising at least one constituent and removing the at least one constituent from the feed stream. The adsorption medium comprises a polyacrylonitrile (PAN) matrix and at least one metal hydroxide homogenously dispersed therein. The adsorption medium may comprise from approximately 15 wt % to approximately 90 wt % of the PAN and from approximately 10 wt % to approximately 85 wt % of the at least one metal hydroxide. The at least one metal hydroxide may be selected from the group consisting of ferric hydroxide, zirconium hydroxide, lanthanum hydroxide, cerium hydroxide, titanium hydroxide, copper hydroxide, antimony hydroxide, and molybdenum hydroxide.

8 Claims, 2 Drawing Sheets

OTHER PUBLICATIONS

Del Razo, L. M., Arellano, M.A., Cebrian, M. E. The Oxidation States of Arsenic in Well Water from a Chronic Arsenicism Area of Northern Mexico. Environmental Pollution, 64, 143-153, 1990.

DeMarco, et al., "Arsenic Removal Using a Polymeric/Inorganic Hybrid Sorbent," Water Research 37 (2003) pp. 164-176.

Gulledge, J. H., O'Conner, J. T. Removal of Arsenic(V) from Water by Adsorption on Aluminum and Ferric Hydroxides. Jour. American WaterWorks Assoc., 548-552, 1973.

Jambor, J. L., Dutrizac, J. E. Occurrence and Constitution of Natural and Synthetic Ferrihydrite, a Widspread Iron Oxyhydroxide. Chem. Rev., 98, 2549-2585, 1998.

Janney et al., "Structure of synthetic 2-line ferrihydrite by electron nanodiffraction," American Mineralogist, vol. 85, pp. 1180-1187, 2000.

Janney et al., "Structure of synthetic 6-line ferrihydrite by electron nanodiffraction," American Mineralogist, vol. 86, pp. 327-335, 2001.

Masud, K. Arsenic in Groundwater and Health Problems in Bangladesh. Water Research, 34, 304-310, 2000.

McKenzie et al., "Direct electrochemistry of nanoparticulate Fe2O3 in aqueous solution and adsorbed onto tin-doped indium oxide," Pure Apl. Chem., vol. 73, No. 12, pp. 1885-1894, 2001.

Navratil, James D., "Adsorption and Nanoscale Magnetic Separation of Heavy Metals from Water," Clemson University, 8 pages, no date.

Nickolaidis, N. P., Dobbs, G. M., Lackovic, J. A. Arsenic Removal by Zero-Valent Iron: Field, Laboratory and Modeling Studies. Water Research, 37, 1417-1425, 2003.

Nickson, R., McArthur, J, Burgess, W. Arsenic Poisoning in Bangladesh Groundwater. Nature, 395, 338, 1998.

Pandey, P. K., Yadav, D., Bhui, A. Arsenic Contamination of the Environment. A New Perspective from Central-East India. Environ. Int., 28, 235-245, 2002.

Parkinson, Gordon, "Crystallisation Program," pp. 74-83,, 2004.

PCT International Search Report dated Nov. 10, 2005.

PCT Written Opinion of the International Searching Authority dated Nov. 10, 2005.

Ramana, et al., Removing Selenium(IV) and Arsenic (V) Oxyanions with Tailored Chelating Polymers, Journal of Environmental Engineering, vol. 118, No. 5, Sep./Oct. 1992, pp. 755-775.

Roberts, L. C., Hug, S. J., Ruettimann, T., Billah, M., Khan, A. W., Rahman, M. T. Arsenic Removal with Iron (II) and Iron (III) in Waters with High Silicate and Phosphate Concentrations. Environmental Science and Technology, 38, 307-315, 2004.

Schwertmann, U., Cornell, R. M. Iron Oxides in the Laboratory, 2nd Ed., WILEY-VCH, Weinheim, Germany, 5-18, 2000.

SenGupta, A.K., Greenleaf, J. E. Arsenic in Subsurface Water: Its Chemistry and Removal by Engineered Processes. Environmental Separation of Heavy Metals, Edited by A. K. SenGupta, 265-306, Lewis Publishers, CRC Press, Boca Raton, FL, 2002.

Sun, X., Doner, H. E. Adsorption and Oxidation of Arsenite on Geothite. Soil Science, 163(4), 278-287, 1998.

Thieme, Trevor, "Newsfiles, Like a Cup of Arsenic? Oh, You've Already Got Some" Popular Science, http://www. popsci.com/popsci/science/article/0,12543,195220,00.html, 2003, 2 pages.

Tokunaga, S., Wasay, S. A., Park, S. Removal of Arsenic(V) Ion from Aqueous Solutions by Lanthanum Compounds. Water Science and Technology, 35(7), 71-78, 1997.

Wasay, S. A., Haron, J., Uchiumi, A., Tokunaga, S. Removal of Arsenite Ions from Aqueous Solution by Basic Yttrium Carbonate. Water Research, 30(5), 1143-1148, 1996.

PCT International Search Report and Written Opinion of the International Searching Authority for PCT/US11/26519, dated May 10, 2011, 9 pages.

\* cited by examiner

METHODS OF USING ADSORPTION MEDIA FOR SEPARATING OR REMOVING CONSTITUENTS

CROSS-REFERENCE TO RELATED APPLICATION

This application is a divisional of application Ser. No. 10/656,028, filed Sep. 4, 2003, now U.S. Pat. No. 7,368,412, issued May 6, 2008. This application is also related to application Ser. No. 12/858,398, filed Aug. 17, 2010, now U.S. Pat. No. 7,947,861, issued May 24, 2011, which is a divisional of application Ser. No. 11/210,577, filed Aug. 23, 2005, now U.S. Pat. No. 7,807,606, issued Oct. 5, 2010, and application Ser. No. 12/725,142, filed Mar. 16, 2010, pending.

GOVERNMENT RIGHTS

This invention was made with government support under Contract No. DE-AC07-99ID13727 and Contract No. DE-AC07-05ID14517 awarded by the U.S. Department of Energy. The government has certain rights in this invention.

FIELD OF THE INVENTION

The present invention relates to an adsorption medium that may be used to remove an undesirable constituent from a water supply. More specifically, the present invention relates to an adsorption medium that includes polyacrylonitrile and a metal hydroxide or metal oxide.

BACKGROUND OF THE INVENTION

Water supplies contaminated with arsenic (As) are a major health and environmental concern in the United States and worldwide. Arsenic is a naturally occurring element that is present in rocks or soils. Over time, the arsenic leaches from the rocks or soils into groundwater, surface water, wells, or other sources of drinking water. This arsenic contamination is referred to as indigenous arsenic contamination. Arsenic-contaminated solutions are also produced in a variety of industries, such as mining, agriculture, semiconductor, or petroleum industries. These arsenic-contaminated solutions include process solutions and waste streams. Arsenic is a known carcinogen that has been shown to cause bladder, kidney, liver, and lung cancer. In 1976, the Environmental Protection Agency ("EPA") established drinking water standards for arsenic at a maximum concentration limit ("MCL") of 50 µg/L or 50 parts per billion ("ppb"). However, even trace amounts of arsenic have been shown to have health risks, which led the EPA to reduce the MCL to 10 ppb. The reduced MCL will be enforced in 2006, which provides only a few years for development and testing of improved technologies for arsenic removal.

Arsenic is present in nature in valence states or oxidation states of $-3$, $0$, $+3$, and $+5$. In water supplies, arsenic contaminants typically exist as As(III) compounds and/or As(V) compounds. The As(III) compounds include As(III) oxyanions or oxyacids, such as $H_3AsO_3$ or $HAsO_2$, depending on the pH of the water supply. The As(V) compounds include As(V) oxyanions, such as $H_2AsO_4^-$ or $HAsO_4^{2-}$, or oxyacids, such as $H_3AsO_4$, depending on the pH of the water supply. Under atmospheric conditions or an oxidizing environment, As(V) compounds are predominantly present in water supplies. As(III) compounds are also known as arsenites, while As(V) compounds are known as arsenates.

Numerous techniques for removing arsenic from water supplies have been proposed and developed. For instance, arsenic removal has utilized anion exchange, cation exchange, polymeric anion exchange, liquid-liquid extraction, activated alumina sorption, coprecipitation, sorption by iron oxide coated sand particles, enhanced coagulation with alum or ferric chloride dosage, ferric chloride coagulation followed by microfiltration, pressurized granulated iron particles, iron oxide doped alginate, manganese dioxide coated sand, polymeric ligand exchange, and zero-valent iron. These techniques primarily rely on ion exchange and Lewis acid-base interactions to remove the arsenic.

In U.S. Pat. No. 5,591,346 to Etzel et al., an iron(III)-complexed cation exchange resin is disclosed for removing arsenic from wastewater or drinking water. The iron(III)-complexed cation exchange resin is formed by loading a strong acid cation exchange resin with iron ions. The cation exchange resin is purchased commercially and then loaded with the iron ions. When the iron(III)-complexed cation exchange resin is contacted with a stream of wastewater or drinking water, the iron ions react with arsenate anions to form an iron arsenate salt complex. The iron arsenate salt complex is immobilized on the cation exchange resin, removing the arsenic from the wastewater or drinking water.

While many techniques for removing arsenic from water supplies are known, conventional ion exchange resins do not provide the specificity to economically remove low concentrations of arsenic. Since many water supplies in the United States, such as groundwater, surface water, or wells, have low concentrations of arsenic, these techniques are not effective to remove the arsenic. In addition, many of these techniques are not selective for arsenic over other ions. To improve the selectively of ion exchange resins for arsenic, granules of metal oxides or metal hydroxides, such as ferric hydroxide, have also been investigated. While these metal oxide or metal hydroxide granules are more selective for arsenic, they have a low porosity and, therefore, have a low capacity for arsenic and poor kinetic properties. To improve the performance of ferric hydroxide, ferric hydroxide has been incorporated into organic polymers. For instance, in "Arsenic Removal Using a Polymeric/Inorganic Hybrid Sorbent," DeMarco et al., Water Research 37 (2003) pp. 164-176, a hydrated iron oxide is dispersed into a polymeric, cation exchange bead. The polymeric, cation exchange beads are commercially available and include a polystyrene matrix having sulfonic acid functional groups. A sorbent is prepared by loading Fe(III) onto the sulfonic acid sites on the cation exchange beads. The Fe(III) is then desorbed and Fe(III) hydroxides are simultaneously precipitated within the cation exchange beads using a strong alkaline solution, encapsulating the hydrated iron oxides within the cation exchange beads. The capacity of the sorbent for arsenic is limited by the total number of sulfonic acid sites on the cation exchange beads. In this sorbent, the hydrated iron oxide is loaded at approximately 0.9% to 1.2% by mass. In other words, only 9 mg of iron per gram of sorbent is loaded at saturation.

In further attempts to improve techniques for removing arsenic from water supplies, an ion exchange resin for removing trace amounts of ions is disclosed in U.S. Pat. No. 4,576,969 to Echigo et al. The ion exchange resin includes a phenolic resin and a metal hydroxide. The ion exchange resin is formed by incorporating a metal salt or metal oxide into the phenolic resin, which is prepared by precondensating a phenol compound with an aldehyde compound and an acid catalyst. The mixture of the metal salt or metal oxide and the phenolic resin is then subjected to a suspension polycondensation reaction in halogenated solvents. The ion exchange resin is isolated from the reaction mixture and treated with an alkaline agent to produce a spherical ion exchange resin. However, the foregoing process of preparing this ion exchange resin is problematic because it is complicated and the halogenated solvents used in the process are difficult to dispose of.

It is expected that large cities, which typically have centralized water treatment facilities, will be able to comply with the new MCL for arsenic using existing technologies, such as precipitation or coagulation treatment. However, small and mid-sized municipalities and other communities as well as rural areas do not have centralized water treatment facilities. Rather, they typically use point of origin treatment schemes, such as chlorination, at the well head prior to distribution. It is estimated that over four thousand municipal water supplies and tens of thousand of private drinking water supplies, primarily in the western United States, would not meet the new MCL standard of 10 ppb arsenic. Under existing technologies, these small and mid-sized municipalities and private users would have to build centralized water treatment facilities in order to comply with the new MCL. However, many small and mid-sized municipalities, as well as private users, cannot afford to build such facilities. Therefore, new technologies for removing arsenic need to be developed to meet the new MCL for arsenic.

BRIEF SUMMARY OF THE INVENTION

The present invention relates to a method of producing an adsorption medium. The method comprises dissolving at least one metal compound in a solvent to form a metal solution. The metal compound may be a metal salt or a metal oxide of a divalent, trivalent, or tetravalent metal. The metal salt or metal oxide may be a salt or oxide of a transition metal, a rare earth metal, a Group III metal, a Group IV metal, or a Group V metal, such as iron, zirconium, lanthanum, cerium, titanium, aluminum, tin, silver, zinc, mercury, bismuth, copper, antimony, tungsten, and molybdenum. Polyacrylonitrile ("PAN") is then dissolved into the metal solution to form a PAN-metal solution, which is deposited into a quenching bath. The quenching bath includes an alkaline agent, such as from approximately 0.1 M sodium hydroxide to approximately 8 M sodium hydroxide. The adsorption medium may be produced by precipitating a metal hydroxide from the PAN-metal solution and insolubilizing the PAN from the PAN-metal solution. The adsorption medium may include solid beads in which the metal hydroxide is incorporated into the PAN. Alternatively, a support, such as a filter, may be impregnated with the adsorption medium. The adsorption medium may include from approximately 10% by weight to approximately 85% by weight of a metal in the form of an elemental metal and the at least one metal hydroxide and from approximately 15% by weight to approximately 90% by weight of the PAN.

The present invention also relates to a method of removing a constituent from a feed stream. The method comprises providing an adsorption medium having at least one metal hydroxide dispersed in a PAN matrix. The adsorption medium may have from approximately 10% by weight to approximately 85% by weight of a metal in the form of an elemental metal and the at least one metal hydroxide and from approximately 15% by weight to approximately 90% by weight of the PAN. The adsorption medium is contacted with a feed stream comprising at least one constituent, such as a feed stream comprising arsenic, selenium, antimony, or mixtures thereof. The adsorption medium is used to remove oxyanions or oxyacids of arsenic, selenium, or antimony from the feed stream. The adsorption medium may reduce the amount of arsenic present in the feed stream to less than approximately 50 parts per billion, such as less than approximately 10 parts per billion.

The present invention also relates to an adsorption medium having increased metal loading. The adsorption medium comprises a PAN matrix and at least one metal hydroxide. The adsorption medium has from approximately 10% by weight to approximately 85% by weight of a metal in the form of an elemental metal and the at least one metal hydroxide and from approximately 15% by weight to approximately 90% by weight of the PAN. The metal hydroxide may be substantially homogenously dispersed in the PAN matrix. The adsorption medium may comprise at least approximately 50% by weight of the elemental metal and the at least one metal hydroxide.

BRIEF DESCRIPTION OF THE DRAWINGS

While the specification concludes with claims particularly pointing out and distinctly claiming that which is regarded as the present invention, the advantages of this invention can be more readily ascertained from the following description of the invention when read in conjunction with the accompanying drawings in which:

DETAILED DESCRIPTION OF THE INVENTION

Figure 1:
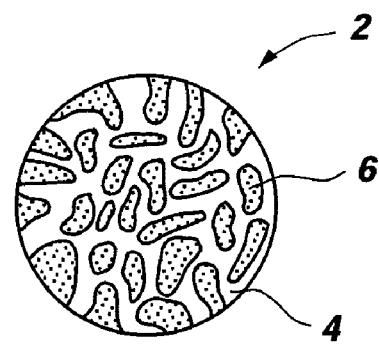
FIG. 1 is a schematic illustration of an embodiment of an adsorption medium of the present invention.

An adsorption medium having increased metal loading and increased capacity is produced. The adsorption medium 2 includes a matrix 4 and at least one active component 6, as shown in FIG. 1. The at least one active component 6 may permeate into pores of the matrix 4 and absorb to the matrix 4. The at least one active component 6 is synthesized during formation of the adsorption medium 2, allowing for increased loading of the at least one active component 6.

The adsorption medium 2 may be used to remove at least one constituent from a feed stream. The feed stream may be, for example, a drinking water source or an industrial water stream having at least one constituent that is to be removed. The drinking water source may include groundwater, surface water, well water, or other drinking water sources. The industrial water stream may be a process solution or a waste stream generated by an industrial process, such as a stream generated by the mining, agriculture, semiconductor, or petroleum industry. The at least one constituent to be removed may be an undesirable component of the feed stream, such as a component that produces health risks when ingested by humans or other mammals. For sake of example only, the at least one constituent may include, but is not limited to, arsenic, selenium, or antimony compounds.

The matrix 4 may be an inert substrate, such as PAN. As used herein, the term "PAN" refers to an acrylonitrile homopolymer or a copolymer containing at least about 40% acrylonitrile units. For instance, the PAN may be an acrylonitrile polymer or a copolymer having a ratio of at least about 40% acrylonitrile molecules to total molecules. PAN may be provided in a solid form. The acrylonitrile homopolymer may include crystalline, quasicrystalline, and/or amorphous phases. The matrix 4 may be constituted to enable formation thereof into a plurality of small, slightly porous, particles, which are also referred to herein as beads. PAN is an organic polymer that is easily formed into spherical beads having a high surface area. However, additional organic and inorganic polymers having these properties, such as polystyrene, may also be used as the matrix 4, provided that the polymer is soluble in a solvent used to produce the adsorption medium 2 and is compatible with the at least one active component 6.

An active component 6 may be selected for its ability to remove the constituent from the feed stream. For sake of example only, the active component 6 may be a metal hydroxide or a metal oxide that is incorporated, or physically trapped, in the matrix 4. The active component 6 may be a hydroxide or an oxide of a divalent, trivalent, or tetravalent metal, such as a hydroxide or an oxide of a transition metal, a lanthanide or rare earth metal, a Group III metal, a Group IV metal, or a Group V metal. For instance, the active component 6 may be a hydroxide or an oxide of iron, zirconium, lanthanum, cerium, titanium, aluminum, tin, silver, zinc, mercury, bismuth, copper, antimony, tungsten, molybdenum. The active component 6 may also include mixtures of metal hydroxides or mixtures of metal oxides that are incorporated in the matrix 4. For sake of example only, a mixture of ferric hydroxide, lanthanum hydroxide, and titanium hydroxide may be present in the matrix 4. By utilizing the mixture of metal hydroxides or mixtures of metal oxides, the adsorption medium 2 may be tailored to remove specific oxidation states of arsenic, selenium, or antimony, depending on which constituents are present in the feed stream. For sake of example only, one metal mixture may be more specific to remove As(III) compounds, while a second metal mixture may have increased specificity for As(V) compounds. The metal mixture may also be tailored to selectively remove constituents in the presence of other potentially competing anions, such as phosphates or nitrates.

To produce the adsorption medium 2 having a metal hydroxide as the active component 6, at least one metal compound may be dissolved in a solvent to form a metal solution. The metal compound may be a metal salt, a metal oxide, or mixtures thereof. For instance, the metal compound may be a salt or an oxide of a divalent, trivalent, or tetravalent metal, such as a salt or an oxide of a transition metal, a lanthanide or rare earth metal, a Group III metal, a Group IV metal, or a Group V metal. The metal in the metal compound may include, but is not limited to, a cation of iron, zirconium, lanthanum, cerium, titanium, aluminum, tin, silver, zinc, mercury, bismuth, copper, antimony, tungsten, or molybdenum. The metal salt may include, but is not limited to, a chloride, an oxychloride, a sulfate, a nitrate, or an acetate of the metal cation. The metal oxide may be an oxide or a hydroxide of the metal. In one embodiment, the metal cation is iron(III), which is provided as an iron salt or as iron oxide ($Fe_3O_4$ or $Fe_2O_3$).

The solvent used to dissolve the metal compound may be a mineral or inorganic acid or an organic solvent in which both the metal compound and the PAN are soluble. In one embodiment, the solvent is concentrated nitric acid ($HNO_3$). Other solvents include, but are not limited to, aprotic polar organic solvents, such as dimethylformamide, dimethylacetamide, dimethylsulfoxide (DMSO), sulfolane, ethylene carbonate, and N-methylpyrrolidone; acids, such as concentrated sulfuric acid; and concentrated aqueous solutions of certain inorganic salts, such as lithium bromide, sodium thiocyanate, and zinc chloride. To achieve a maximum concentration of the metal hydroxide in the adsorption medium 2, the metal compound may be dissolved in the metal solution in an amount sufficient to provide maximum solubility. In other words, a saturated solution of the metal compound in the solvent may be produced. For sake of example only, if the metal hydroxide on the adsorption medium 2 is ferric hydroxide (FeO(OH)), approximately 70 g/L of iron (as a salt or oxide of iron, such as iron oxide ($Fe_3O_4$)), may be dissolved in the solvent. If a maximum concentration of the metal hydroxide is not desired in the adsorption medium 2, the amount of the metal compound in the metal solution may be decreased from the maximum solubility to provide a desired concentration.

The PAN may be dissolved in the metal solution to form a PAN-metal solution. The PAN may be dissolved in the metal solution from approximately 3% by weight ("wt %") to approximately 5 wt %. As previously described, PAN is an inert substrate that is readily formed into spherical beads and provides a high surface area adsorption medium 2 in combination with the metal hydroxide. However, additional polymers having these properties may be used as the matrix 4, as long as the polymer is soluble in the solvent used in the metal solution. The polymer may also be compatible with the metal compound used in the metal solution. The PAN may be added to the metal solution with slight agitation and heating to dissolve the PAN.

Various techniques may be used to produce the adsorption medium 2 from the PAN-metal solution. Solid beads of the adsorption medium 2 may be formed by spraying the PAN-metal solution through an air/nozzle device into a quenching bath. The air/nozzle device may be a conventional spray nozzle that is adjusted to form droplets of a desired size. The droplets solidify into beads when they contact the quenching bath. The air/nozzle device may also utilize air to accelerate formation or release of the droplets. The quenching bath also causes metal hydroxide to precipitate from the PAN-metal solution and become incorporated into the PAN. The quenching bath may be an aqueous, alkaline solution that includes an alkaline agent, such as sodium hydroxide or potassium hydroxide. The concentration of the alkaline agent in the alkaline solution may range from approximately 0.1 M to approximately 8 M. Desirably, the concentration of the alkaline agent ranges from approximately 0.5 M to approximately 6 M. More desirably, the concentration of the alkaline agent is approximately 1 M. The quenching bath may be constantly stirred while the PAN-metal solution is sprayed into it.

The alkaline agent in the quenching bath may cause the metal compound in the droplets of the PAN-metal solution to dissociate into a metal cation and an anion. Upon contact with the quenching bath, the metal cation reacts with the alkaline solution to form the metal hydroxide, which is water-insoluble. Simultaneously, the PAN in the droplets becomes insoluble in the alkaline solution, forming solid beads that have the metal hydroxide incorporated into the PAN. The metal hydroxide may be homogenously dispersed within the PAN. The quenching bath is used to dilute, remove, or neutralize the solvent in the droplets, causing the PAN to become insoluble and solidify. Since the metal hydroxide is produced from the metal oxide or metal salt during the formation of the adsorption medium 2, the adsorption medium 2 may have an increased metal loading compared to the metal loading in conventional ion exchange resins. The metal loading of the adsorption medium 2 may be up to approximately seventy times the metal loading achieved with conventional ion exchange resins. In one embodiment where ferric hydroxide is the active component 6, the metal loading of the adsorption medium 2 ranges from approximately 250 mg of iron per gram of the adsorption medium 2 to approximately 300 mg of iron per gram of the adsorption medium 2. With the increased loading, the solid beads may have an increased capacity for the constituents compared to the capacity of conventional ion exchange resins. The solid beads may include from approximately 10 wt % to approximately 85 wt % of the metal in the form of an elemental metal and/or the metal hydroxide. The solid beads having the metal hydroxide incorporated into the PAN are removed from the quenching bath, rinsed, dried, and screened to obtain a desired size fraction of the solid beads. The solid beads may have the metal hydroxide incorporated into, or physically trapped in, the matrix 4. In one embodiment, the solid beads may include at least approximately 50 wt % of the metal in the form of the elemental metal and/or the metal hydroxide, such as approximately 85 wt %. For sake of example only, if iron oxide is used as the metal compound, the resulting solid beads may include at least 50 wt % iron in the form of Fe(III) and/or FeO(OH).

The remainder of the solid beads may include PAN. For instance, the solid beads may include from approximately 15 wt % to approximately 90 wt % of the PAN. If the solid beads include a mixture of metals, the PAN may be present from approximately 15 wt % to approximately 20 wt %. The remainder of the solid beads may include from approximately 80 wt % to approximately 85 wt% of the metal in the form of an elemental metal and/or the metal hydroxide. In one embodiment, the solid beads include approximately 25 wt % to approximately 30 wt % of Fe(III), which equates to approximately 40 wt % to approximately 50 wt % as FeO(OH), and approximately 40 wt % to approximately 50 wt % PAN.

A rate at which the metal hydroxide precipitates from the PAN-metal solution may affect the shape and metal loading of the solid beads that are formed. The precipitation rate of the metal hydroxide may be adjusted by adjusting the concentration of the alkaline agent in the alkaline solution. If the concentration of the alkaline agent is high, the metal hydroxide may precipitate quickly and the solid beads may not be sufficiently spherical. However, loading of the metal hydroxide on the solid beads may be increased. In contrast, if the concentration of the alkaline agent is low, the metal hydroxide precipitates slowly and forms spherical, solid beads. However, these solid beads may have a decreased loading of the metal hydroxide.

Alternatively, the adsorption medium 2 may be impregnated onto a support, such as a filter, disc, or membrane. The support may be a fibrous material, such as a glass wool fiber. A pressure differential, such as a vacuum, may be applied on one side of the filter. The PAN-metal solution may be applied to the high pressure side of the pressure differential. The pressure differential causes the PAN-metal solution to flow into, and impregnate, the filter. The impregnated filter may be immersed in a water bath to dilute, remove, or otherwise neutralize the solvent. Diluting the solvent may cause the PAN to solidify in the support. For instance, the PAN may solidify, forming a filter disk or a filter medium that includes the PAN and the metal hydroxide. In other words, the impregnated support may include the metal hydroxide incorporated into, or physically trapped in the PAN. The adsorption medium 2 may also be used in a cartridge.

The loading of the metal in the adsorption medium 2 and, therefore, the concentration of the metal hydroxide in the adsorption medium 2 may be limited by the solubility of the metal in the metal solution. During formation of the adsorption medium 2, the PAN and the metal cation are each present at the same time in a liquid state. Since the PAN and the metal hydroxide are formed into the adsorption medium 2 at the same time and do not require active sites, the concentration of the metal hydroxide in the adsorption medium 2 is not limited by the number of active sites on the adsorption medium 2. In contrast, the metal loading in conventional ion exchange resins, where the metal is added to a preformed ion exchange resin, is limited by the number of active sites on the ion exchange resin. Therefore, the adsorption medium 2 of the present invention may have a capacity approximately 70 times higher than that of conventional ion exchange resins. The adsorption medium 2 may also have a high surface area and porosity, which provides the adsorption medium 2 with an increased removal capacity for the constituents compared to conventional ion exchange resins. In addition, the adsorption medium 2 may be selective for certain constituents, such as arsenic, in the presence of other potentially competing anions, such as phosphate or nitrate.

To produce the adsorption medium 2 having a metal oxide as the active component 6, the matrix 4 may be dissolved in an organic solvent to form a PAN solution. Any organic solvent may be used provided that the organic solvent does not dissolve the metal oxide groups. For sake of example only, the organic solvent may be DMSO. In one embodiment, the matrix 4 is PAN and is dissolved in DMSO. The metal oxide may be ground into a fine powder and added to the PAN solution. The metal oxide may be an oxide of a divalent, a trivalent, or a tetravalent metal, such as an oxide of a transition metal, a lanthanide or rare earth metal, a Group III metal, a Group IV metal, or a Group V metal. For instance, the metal oxide may be an oxide of iron, zirconium, lanthanum, cerium, titanium, aluminum, tin, silver, zinc, mercury, bismuth, copper, antimony, tungsten, molybdenum. The metal oxide may be homogenously dispersed into the PAN solution to form a metal oxide-PAN solution. Solid beads that include PAN and the metal oxide may be formed by spraying the metal oxide-PAN solution through an air/nozzle device into a quenching bath, as previously described, except that the quenching bath is a water bath. The solid beads are removed from the quenching bath, rinsed, dried, and screened to obtain a desired size fraction of the solid beads. The resulting solid beads may have the metal oxide incorporated into, or physically trapped in the matrix 4.

Figure 2:
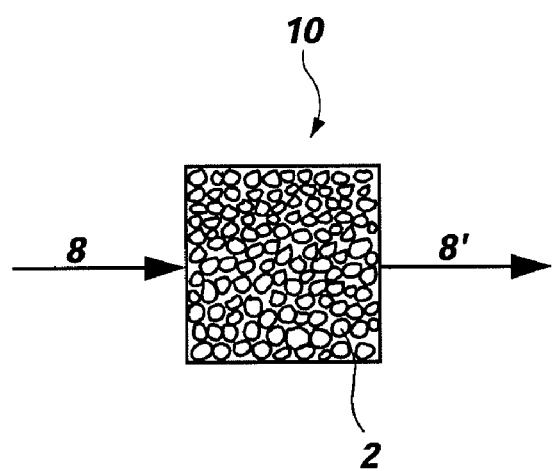
FIG. 2 illustrates one embodiment of a process of making the adsorption medium.

The adsorption medium 2 of the present invention may be used to remove oxyanion or oxyacid constituents of arsenic, selenium, or antimony from the feed stream 8, as shown in FIG. 2. As previously described, the feed stream 8 includes at least one of these constituents. The feed stream 8 may be a drinking water source or an industrial water stream that is contaminated with at least one of the constituents. For sake of example only, the adsorption medium 2 may be used to remove As(III) oxyacids, such as $H_3AsO_3$ or $HAsO_2$, or As(V) oxyanions or oxyacids, such as $H_3AsO_4$, $H_2AsO_4^-$, or $HAsO_4^{2-}$. The feed stream 8 may be passed through the adsorption medium 2 to remove the arsenic before the feed stream 8 is distributed to users as potable water. The adsorption medium 2 has the capability of removing a substantial portion of the arsenic, even when the arsenic is present in the feed stream 8 at a low concentration. Since the adsorption medium 2 has a high capacity for the constituents, the feed stream 8' that exits the adsorption medium 2 may be substantially free of the constituents. In other words, the feed stream 8' is substantially free of arsenic, selenium, or antimony and, therefore, may be a potable water supply.

To remove the oxyanion or oxyacid constituents of arsenic, selenium, or antimony, the feed stream 8 may be passed through the adsorption medium 2 in a single pass operation. When these constituents contact the metal hydroxide in the adsorption medium 2, a metal complex of the constituent may be formed. For sake of example only, if the feed stream includes arsenic oxyanions or oxyacids and is passed over an adsorption medium 2 that includes ferric hydroxide, the metal complex may be an iron arsenate salt complex or an iron arsenite salt complex. The metal complex is immobilized on the adsorption medium 2 and, therefore, the constituent is removed from the wastewater or drinking water. When the adsorption medium 2 is loaded with the metal complexes of the constituents to a maximal capacity, the adsorption medium 2 may be removed and disposed of, such as in a landfill. It is believed that the adsorption medium 2 loaded with the metal complexes of the constituents may meet criteria of the Toxicity Characterization Leaching Procedure and, therefore, may be disposed of. However, the adsorption medium 2 may also be regenerated and reused by treating the adsorption medium 2 loaded with the metal complexes with an alkaline solution.

In one embodiment, the adsorption medium 2 may be used to remove or reduce indigenous arsenic contamination in the feed stream 8 to make the water supply potable. For instance, the adsorption medium 2 may be used to remove arsenic from the feed stream 8 having an arsenic concentration of less than approximately 50 ppb. The adsorption medium 2 may be used to reduce the concentration of arsenic to a concentration of less than approximately 10 ppm. Since the adsorption medium 2 provides a large surface area and a consequent increased capacity for arsenic, large volumes of the feed stream 8 may be passed through the adsorption medium 2 before the adsorption medium 2 is loaded to a maximal capacity with the arsenic complexes. One liter of the adsorption medium 2 may be used to treat from approximately 30,000 bed volumes to approximately 100,000 bed volumes of the feed stream 8. However, the adsorption medium 2 may also be used to remove arsenic from the feed stream 8 having an arsenic concentration of greater than 50 ppb. The adsorption medium 2 may be used to reduce the concentration of arsenic to a concentration of less than approximately 50 ppm. The adsorption medium 2 may also be used to treat or remediate contaminated surface waters or effluents produced by industrial activities.

To effectively remove the constituents, a pH of the feed stream 8 may be at least approximately 6. For instance, the pH of the feed stream 8 may range from approximately 6 to approximately 8. The pH of the feed stream may be maintained at least approximately 6 so that the constituents to be removed are present as oxyanions or oxyacids.

The adsorption medium 2 may be packed into a bed 10 that is used at the well head or point of origin of a water supply. Packed beds 10 are known in the art and, therefore, the formation of the packed bed 10 is not described in detail herein. The packed bed 10 may include a housing within which the adsorption medium 2 is contained. In one embodiment, spherical beads of the adsorption medium 2 are packed so that sufficient spaces are present between the spherical beads to allow the feed stream 8 to pass through the packed bed 10. Once the feed stream 8 has passed through the packed bed 10 and the constituents are removed, the feed stream 8' may be distributed as potable water. Since the packed bed 10 is easily formed, the adsorption medium 2 may be an easy and economical way for small and mid-sized municipalities and other smaller-volume water users to remove the constituents from the feed stream 8. More specifically, the adsorption medium 2 may be used to remove arsenic contaminants in the feed stream 8 to a concentration below the newly reduced MCL. The arsenic may be removed at a lower capital and operating cost than is required to establish a centralized water treatment facility.

EXAMPLES

Example 1

Preparation of Solid Beads Having Ferric Hydroxide Incorporated in a PAN Matrix

Solid beads of the adsorption medium 2 were prepared by dissolving approximately 70 g/L of iron oxide into concentrated nitric acid to form the metal solution. PAN was then dissolved in the metal solution to form the PAN-metal solution having approximately 3 wt % to approximately 5 wt % PAN. The PAN-metal solution was then sprayed through an air/nozzle device into an alkaline quenching bath having 3 M NaOH to form the solid beads. The solid beads were removed from the alkaline quenching bath, rinsed with ethanol, dried at a temperature of approximately 60° C., and screened to obtain a desired size fraction of the solid beads. Solid beads having PAN and ferric hydroxide were produced. The solid beads had approximately 30% Fe(III).

Example 2

Determination of Equilibrium Arsenic Capacity

Figure 3:
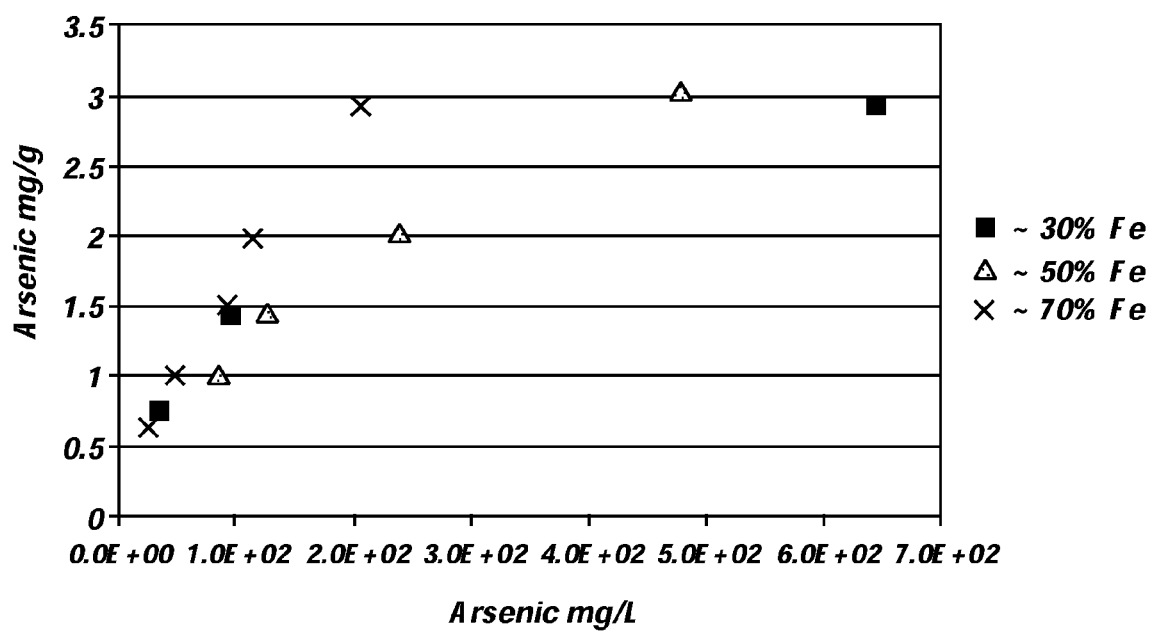
FIG. 3 is a graph of equilibrium isotherms showing iron loadings ranging from 30 wt % to 70 wt %.

The solid beads described in Example 1 were tested to determine equilibrium arsenic capacity at various feed concentrations. A known weight of the solid beads was contacted with a water sample having a specific arsenic concentration. Contacts between the solid beads and the water sample were repeated using different weights of the solid beads to obtain a plot of equilibrium arsenic concentration in the solid phase versus equilibrium arsenic concentration in the liquid phase. These plots are referred to as equilibrium isotherms. FIG. 3 shows iron loadings ranging from 30 wt % to 70 wt %. These equilibrium isotherms provide data at or near the low arsenic concentrations that exist in potable water in the United States. As FIG. 3 shows, at 70% iron loading, the adsorption medium 2 provides an arsenic loading of approximately 3 mg/g with 20 ppb arsenic in the feed stream 8. Since the concentration of arsenic is very low in the feed stream 8, there is a correspondingly low concentration gradient or driving force for mass diffusion into the solid phase. Therefore, 3 mg/g arsenic in the solid phase is quite high.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents, and alternatives falling within the spirit and scope of the invention as defined by the following appended claims.

What is claimed is:

1. A method of removing a constituent from a feed stream, comprising:
    contacting an adsorption medium with a feed stream comprising at least one constituent, the adsorption medium comprising a polyacrylonitrile (PAN) matrix and at least one metal hydroxide homogenously dispersed in the PAN matrix, the adsorption medium comprising from approximately 15% by weight to approximately 90% by weight of the PAN and from approximately 10% by weight to approximately 85% by weight of a metal in the form of at least one of an elemental metal and at least one metal hydroxide; and
    removing the at least one constituent from the feed stream.

2. The method of claim 1, wherein contacting an adsorption medium with a feed stream comprising at least one constituent comprises contacting the adsorption medium with a feed stream comprising at least one constituent selected from the group consisting of arsenic, selenium, and antimony.

3. The method of claim 1, wherein contacting an adsorption medium with a feed stream comprising at least one constituent comprises contacting the adsorption medium with the feed stream comprising an oxyanion or an oxyacid of arsenic, selenium, or antimony.

4. The method of claim 1, wherein removing the at least one constituent from the feed stream comprises reducing an amount of arsenic in the feed stream to less than approximately 50 parts per billion.

5. The method of claim 1, wherein removing the at least one constituent from the feed stream comprises reducing an amount of arsenic in the feed stream to less than approximately 10 parts per billion.

6. The method of claim 1, wherein contacting an adsorption medium with a feed stream comprising at least one constituent comprises contacting the adsorption medium comprising the PAN matrix and at least one metal hydroxide selected from the group consisting of ferric hydroxide, zirconium hydroxide, lanthanum hydroxide, cerium hydroxide, titanium hydroxide, copper hydroxide, antimony hydroxide, and molybdenum hydroxide with the feed stream.

7. The method of claim 1, wherein contacting an adsorption medium with a feed stream comprising at least one constituent comprises contacting the adsorption medium with the feed stream comprising a pH of from approximately 6 to approximately 8.

8. A method of removing a constituent from a feed stream, comprising:
   contacting an adsorption medium with a feed stream comprising at least one constituent, the adsorption medium comprising a polyacrylonitrile (PAN) matrix and at least one metal hydroxide selected from the group consisting of ferric hydroxide, zirconium hydroxide, lanthanum hydroxide, cerium hydroxide, titanium hydroxide, copper hydroxide, antimony hydroxide, and molybdenum hydroxide; and
   removing the at least one constituent from the feed stream.

* * * * *

UNITED STATES PATENT AND TRADEMARK OFFICE
CERTIFICATE OF CORRECTION

| | |
|---|---|
| PATENT NO. | : 8,043,586 B2 |
| APPLICATION NO. | : 11/941428 |
| DATED | : October 25, 2011 |
| INVENTOR(S) | : Troy J. Tranter et al. |

It is certified that error appears in the above-identified patent and that said Letters Patent is hereby corrected as shown below:

On the title page:
In ITEM (56) References Cited
OTHER PUBLICATIONS

| | |
|---|---|
| Page 1, $2^{nd}$ column, $1^{st}$ line of the $7^{th}$ entry (line 21), | change "Chiu,, K. H.," to --Chiu, K. H.,-- |
| Page 1, $2^{nd}$ column, $2^{nd}$ line of the $7^{th}$ entry (line 22), | change "of he Blackfoot" to --of the Blackfoot-- |
| Page 1, $2^{nd}$ column, $3^{rd}$ line of the $9^{th}$ entry (line 30), | change "603, 627" to --603-627-- |
| Page 1, $2^{nd}$ column, $1^{st}$ line of the $10^{th}$ entry (line 31), | change "Mandel, B. K.," to --Mandal, B. K.,-- |
| Page 1, $2^{nd}$ column, $2^{nd}$ line of the $10^{th}$ entry (line 32), | change "Chowdhurry, P. P. ," to --Chowdhury, P. P.,-- |
| Page 2, $1^{st}$ column, $1^{st}$ line of the $1^{st}$ entry (line 3), | change "Cebrian, M. E." to --Cebrián, M. E.-- |
| Page 2, $1^{st}$ column, $1^{st}$ line of the $3^{rd}$ entry (line 8), | change "O'Conner, J. T." to --O'Connor, J. T.-- |
| Page 2, $1^{st}$ column, $3^{rd}$ line of the $3^{rd}$ entry (line 10), | change "WaterWorks" to --Water Works-- |
| Page 2, $1^{st}$ column, $2^{nd}$ line of the $4^{th}$ entry (line 12), | change "Widspread" to --Widespread-- |
| Page 2, $1^{st}$ column, $1^{st}$ line of the $8^{th}$ entry (line 21), | change "Fe2O3" to --$Fe_2O_3$-- |
| Page 2, $1^{st}$ column, $3^{rd}$ line of the $8^{th}$ entry (line 23), | change "Apl. Chem.," to --Appl. Chem.,-- |
| Page 2, $1^{st}$ column, $1^{st}$ line of the $10^{th}$ entry (line 26), | change "Nickolaidis," to --Nikolaidis,-- |
| Page 2, $2^{nd}$ column, $1^{st}$ line of the $1^{st}$ entry (line 1), | change "74-83,, 2004." to --74-83, 2004.-- |

Signed and Sealed this
Thirteenth Day of March, 2012

David J. Kappos
*Director of the United States Patent and Trademark Office*

CERTIFICATE OF CORRECTION (continued)
U.S. Pat. No. 8,043,586 B2

On the title page (continued):
In ITEM (56) References Cited
    OTHER PUBLICATION
        Page 2, $2^{nd}$ column, $2^{nd}$ line of the     change "Geothite." to --Goethite.--
            $8^{th}$ entry (line 19), Page 2, $2^{nd}$ column, $2^{nd}$ line of the     change "http://www. popsci.com/" to
            $9^{th}$ entry (line 21),                                   --http://www.popsci.com/--

In the specification:
        COLUMN 5,    LINE 18,        change "molybdenum." to --or molybdenum.--
        COLUMN 8,    LINE 24,        change "molybdenum." to --or molybdenum.--
        COLUMN 9,    LINE 36,        change "at least" to --at at least--